United States Patent
Shen

(10) Patent No.: US 8,924,702 B2
(45) Date of Patent: Dec. 30, 2014

(54) METHOD FOR SWITCHING DUAL OPERATING SYSTEM ON DOCKING SYSTEM

(75) Inventor: Chun-Te Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 296 days.

(21) Appl. No.: 13/528,813

(22) Filed: Jun. 20, 2012

(65) Prior Publication Data

US 2013/0054952 A1 Feb. 28, 2013

(30) Foreign Application Priority Data

Aug. 30, 2011 (TW) .............................. 100131081 A

(51) Int. Cl.
  *G06F 15/177* (2006.01)
  *G06F 13/00* (2006.01)
  *G06F 9/44* (2006.01)

(52) U.S. Cl.
  CPC .............. *G06F 13/00* (2013.01); *G06F 15/177* (2013.01); *G06F 9/441* (2013.01)
  USPC .................................................. 713/2; 713/1

(58) Field of Classification Search
  CPC ...... G06F 9/4406; G06F 9/441; G06F 15/177
  USPC ....................................................... 713/1, 2
  See application file for complete search history.

(56) References Cited

U.S. PATENT DOCUMENTS

| | | | |
|---|---|---|---|
| 6,654,826 B1 | 11/2003 | Cho et al. | |
| 7,840,793 B2* | 11/2010 | Wang | 713/2 |
| 8,589,952 B2* | 11/2013 | Wong et al. | 719/319 |
| 2002/0157001 A1* | 10/2002 | Huang et al. | 713/2 |
| 2003/0110331 A1* | 6/2003 | Kawano et al. | 710/58 |
| 2004/0103304 A1* | 5/2004 | Shao | 713/200 |
| 2008/0077786 A1* | 3/2008 | Pierce et al. | 713/2 |
| 2009/0031329 A1* | 1/2009 | Kim | 719/327 |
| 2011/0093691 A1* | 4/2011 | Galicia et al. | 713/2 |
| 2011/0126216 A1* | 5/2011 | Galicia et al. | 719/318 |
| 2011/0271088 A1* | 11/2011 | Princen et al. | 713/2 |
| 2012/0054401 A1* | 3/2012 | Cheng | 710/304 |
| 2012/0084542 A1* | 4/2012 | Reeves et al. | 713/1 |

FOREIGN PATENT DOCUMENTS

JP 08-339295 * 12/1996

* cited by examiner

*Primary Examiner* — Chun Cao
(74) *Attorney, Agent, or Firm* — Jianq Chyun IP Office

(57) ABSTRACT

An operating method of a dual operating system, adapted to switch a first operating system and a second operating system on a docking system composed of a portable electronic device and a docking station, wherein the portable electronic device stores the first operating system and the first part of the second operating system, and the docking station stores the second part of the second operating system, the operating method comprising automatically starting the first part of the second operating system when the portable device operates the first operating system and is in an idle mode of the first operating system. When the portable device is coupled to the docking system and operates the second operating system and is in the idle mode of the second operating system, the portable device automatically loads and executes the first operating system.

23 Claims, 3 Drawing Sheets

METHOD FOR SWITCHING DUAL OPERATING SYSTEM ON DOCKING SYSTEM

CROSS-REFERENCE TO RELATED APPLICATION

This application claims the priority benefit of Taiwan application serial no. 100131081, filed on Aug. 30, 2011. The entirety of the above-mentioned patent application is hereby incorporated by reference herein and made a part of this specification.

BACKGROUND OF THE INVENTION

1. Field of the Invention

The invention relates to an operating method for an operating system. Particularly, the invention relates to an operating method for a dual operating system, a portable device and a docking system using the same.

2. Description of Related Art

To cope with a busy pace of modern life, various mobile devices occupying less space and easy to carry are developed. Taking a smart phone as an example, it not only has various functions of a conventional communication device, but also allows a user to write documents, send and receive emails, browse websites, or use instant messaging software through software inbuilt therein. Namely, the mobile device is not only used for making phone calls, but is also used to provide diversified functions as that does of a smaller personal computer, and with development of wireless network techniques, usage of theses functions is not limited by time and space, and for the modern people demanding efficiency, such device has become one of independent tools in daily life.

The aforementioned portable electronic device generally applies a mobile operating system to implement various functions. Compared to a general computer operating system used in notebook computers, desktop computers or terminal devices, the mobile operating system cannot achieve diversified functions as that does of the general computer operating system. For example, a window operating system such as Windows XP or Windows VISTA can handle complicated works such as document editing and image processing, etc., and have higher performance than the mobile operating system. Therefore, in order to improve the performance of the portable electronic device, the conventional technique provides a docking system having a dual operating system structure, in which portability of the mobile operating system and functionality of the general computer operating system are integrated. However, in operation of the dual operating system, when one operating system is switched to another operating system, a lot of time is wasted for waiting the portable electronic device to stop the currently executed operating system, and reboot and start another operating system. Such process is not only time-consuming, but is also of no avail for switching the two operating systems.

SUMMARY OF THE INVENTION

The invention is directed to an operating method of a dual operating system, by which when a portable electronic device is docked to a docking station or is removed from the docking station, two operating systems are capable of being quickly switched.

The invention is directed to a portable electronic device, which is capable of being quickly switched between two operating systems.

The invention is directed to a docking system, by which a portable electronic device docked to a docking station is capable of being quickly switched between two operating systems.

The invention provides an operating method of a dual operating system, adapted to switch a first operating system and a second operating system on a docking system composed of a portable electronic device and a docking station, where the second operating system includes a first part and a second part, and the portable electronic device stores a first operating system and the first part of the second operating system, and the docking station stores the second part of the second operating system. The method comprises following steps. When the portable electronic device executes the first operating system, and in a normal operating state of the first operating system, the portable electronic device automatically starts the first part of the second operating system, and restores an operating frame of the first operating system after executing the first part of the second operating system. When the portable electronic device and the docking station are coupled to each other, and the portable electronic device executes the second operating system, in the normal operating state of the second operating system, the portable device automatically starts the first operating system and restores an operating frame of the second operating system after completing a booting procedure of the first operating system.

The invention provides a portable electronic device, adapted to be coupled to a docking station, and the portable electronic device includes a storage medium, a processor and a connection controller. The storage medium stores a first operating system and a first part of a second operating system, where the second operating system is composed of the first part and a second part stored in the docking station. When the processor executes the first operating system, and a time for the first operating system being in an idle mode exceeds a predetermined time, the processor automatically starts the first part of the second operating system, and restores an operating frame of the first operating system after executing the first part of the second system. When the portable electronic device is connected to the docking station, the processor executes the complete second operating system composed of the first part stored in the storage medium and the second part stored in the docking station, and when a time for the second operating system being in the idle mode exceeds the predetermined time, the processor automatically starts the first operating system, and restores an operating frame of the second operating system after completing a booting procedure of the first operating system. The connection controller is used for detecting a connection state of the portable electronic device and the docking station.

The invention provides a docking system including a portable electronic device and a docking station. The portable electronic device includes a first storage medium storing a first operating system and a first part of a second operating system, a connection connector and a processor. The docking station is connected the portable electronic device, where the docking station includes a second storage medium storing a second part of the second operating system, and the second operating system is composed of the first part and the second part. When the processor executes the first operating system, and a time for the first operating system being in an idle mode exceeds a predetermined time, the processor automatically starts the first part of the second operating system, and restores an operating frame of the first operating system after executing the first part of the second system. When the processor executes the complete second operating system composed of the first part stored in the storage medium and the second part stored in the docking station, and when a time for the second operating system being in the idle mode exceeds the predetermined time, the processor automatically starts the first operating system, and restores an operating frame of the second operating system after completing a booting procedure of the first operating system.

In an embodiment of the invention, a storage space of the first operating system is smaller than a storage space of the second operating system.

In an embodiment of the invention, the first part of the second operating system includes operating system activation prerequisite kernel codes for starting the second operating system.

In an embodiment of the invention, the second part of the second operating system includes application program activation codes.

In an embodiment of the invention, the step that the portable electronic device executes the first operating system and automatically starts the first part of the second operating system in the normal operating state of the first operating system includes following steps. The portable electronic device is rebooted. The first part of the second operating system is loaded. The first part of the second operating system is executed.

In an embodiment of the invention, the step that the portable electronic device executes the second operating system includes loading and executing the first part of the second operating system stored in the portable electronic device and the second part of the second operating system stored in the docking station.

In an embodiment of the invention, the step that the portable electronic device executes the second operating system and automatically starts the first operating system in a normal operating state of the second operating system includes following steps. The portable electronic device is rebooted. The first operating system is loaded. The first operating system is executed.

In an embodiment of the invention, the docking station further includes an input module.

According to the above descriptions, in the invention, the portable electronic device executes an operating system, and when the time for the operating system being in the idle mode exceeds the predetermined time, as none important program is executed in the idle mode, the portable electronic device automatically starts another operating system to prepare for the subsequent switching operation of the dual operating system (for example, initially start and execute a part of the second operating system or completely start the first operating system). Therefore, when the user switches the portable electronic device from the operating system to the other operating system, a time for starting the other operating system is greater reduced, so that the two operating systems can be quickly switched.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the invention, a switch operation between a first operating system and a second operating system is performed on a docking system composed of a portable electronic device and a docking station. The portable electronic device is, for example, a personal digital assistant (PDA) or a mobile phone.

The first operating system is, for example, an operating system used in the portable electronic device, which includes windows mobile of Microsoft, iOS operating system of Apple, Android operating system of Google and other operating systems suitable for the portable electronic device. The second operating system is, for example, suitable for a large-scale computer device, such as a notebook computer, a home computer or a terminal device, etc. Namely, a storage space of the first operating system is smaller than a storage space of the second operating system.

The second operating system is composed of a first part and a second part. In an embodiment, the second operating system can be started in two phases. Therefore, the portable electronic device stores the first operating system and the first part of the second operating system, and the docking station stores the second part of the second operating system. In an embodiment, the first part of the second operating system includes operating system activation prerequisite kernel codes for starting the second operating system. For example, the operating system activation prerequisite kernel codes include kernel codes that have to be executed during a kernel initiation phase for starting the Microsoft Windows operating system. In another embodiment, the second part of the second operating system includes application program activation codes, for example, program codes executed during a logon phase after the kernel initiation phase for starting the Microsoft Windows operating system is completed.

Figure 1:
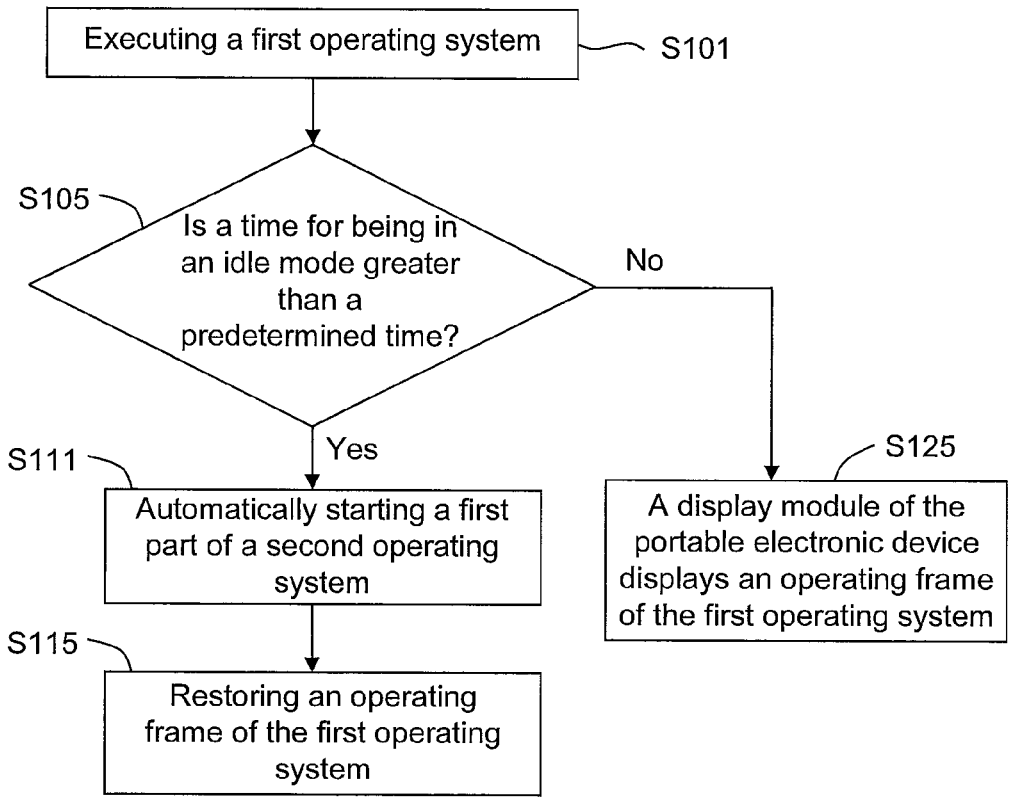
FIG. 1 is a simple flowchart illustrating an operating method of a dual operating system according to an embodiment of the invention.

FIG. 1 is a simple flowchart illustrating an operating method of a dual operating system according to an embodiment of the invention. First, a state of the portable electronic device is determined. Referring to FIG. 1, in step S101, the portable electronic device executes the first operating system, and in step S105, in a normal state of the first operating system, it is determined whether a time for the first operating system executed by the portable electronic device being in an idle mode exceeds a predetermined time, where the idle mode is a state that a processor usage rate is lower than a setting value when the portable electronic device executes the first operating system. The setting value of the processor usage rate is, for example, 5%-50%, and the predetermined time is for example, 10-20 minutes, though the invention is not limited thereto. In another embodiment, the predetermined time can be an idle time upper limit set by the user.

In step S111, when the time for the first operating system executed by the portable electronic device being in the idle mode exceeds the predetermined time, the portable electronic device automatically starts the first part of the second operating system. Then, in step S115, after activation of the first part of the second operating system is completed, an operating frame of the first operating system is restored. On the other hand, when it is determined that the time for the first operating system executed by the portable electronic device being in the idle mode does not exceed the predetermined time in the step S105, a display module of the portable electronic device displays the operating frame of the first operating system (step S125), which is, for example, a desktop frame of the first operating system.

Figure 2:
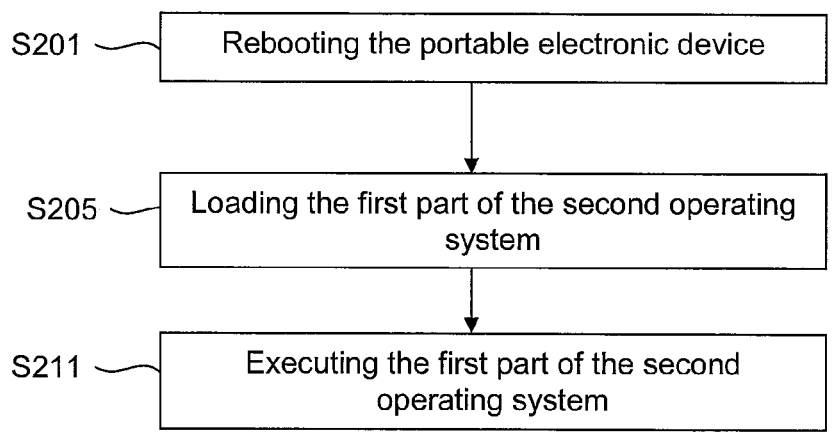
FIG. 2 is a simple flowchart illustrating a flow that a portable electronic device executes a first operating system and automatically starts a second operating system under an idle mode of the first operating system according to an embodiment of the invention.

Moreover, in an embodiment, steps that the portable electronic device automatically starts the first part of the second operating system are as follows. FIG. 2 is a simple flowchart illustrating a flow that the portable electronic device executes the first operating system and automatically starts the second operating system under a normal operating state of the first operating system according to an embodiment of the invention. Referring to FIG. 2, in step S201, the portable electronic device is rebooted. Then, in step S205, the first part of the second operating system is loaded, where the step of loading the first part of the second operating system is to, for example, load the second operating system into a memory of the portable electronic device. Then, in step S211, the first part of the second operating system is executed, where the step of executing the first part of the second operating system is to, for example, execute the first part of the second operating system by using a processor, so as to initially start and execute the second operating system.

Moreover, in another embodiment, the step S101 that the portable electronic device executes the first operating system and the step S105 of determining whether the time for the first operating system executed by the portable electronic device being in the idle mode exceeds the predetermined time are, for example, performed under a state that the portable electronic device and the docking station are coupled to each other. Certainly, in still another embodiment, the step S101 that the portable electronic device executes the first operating system and the step S105 of determining whether the time for the first operating system executed by the portable electronic device being in the idle mode exceeds the predetermined time are, for example, performed under a state that the portable electronic device and the docking station are not coupled to each other. Namely, regardless of whether or not the portable electronic device is coupled to the docking station, when the portable electronic device executes the first operating system and the time for the first operating system executed by the portable electronic device being in the idle mode exceeds the predetermined time, the portable electronic device automatically starts the first part of the second operating system. In other words, during a period when the user does not operate the portable electronic device, or when the portable electronic device has a low loading, the portable electronic device automatically starts the first part of the second operating system to initially execute the second operating system. Therefore, when the user subsequently connects the portable electronic device to the docking station (or the portable electronic device has been coupled to the docking station), and switches the first operating system to the second operating system, the second part of the second operating system stored in the docking station can be directly started to save a time of starting the second operating system. The portable electronic device further has a connection controller for detecting whether the portable electronic device is connected to the docking station, so as to determine whether the portable electronic device can execute the complete second operating system.

Figure 3:
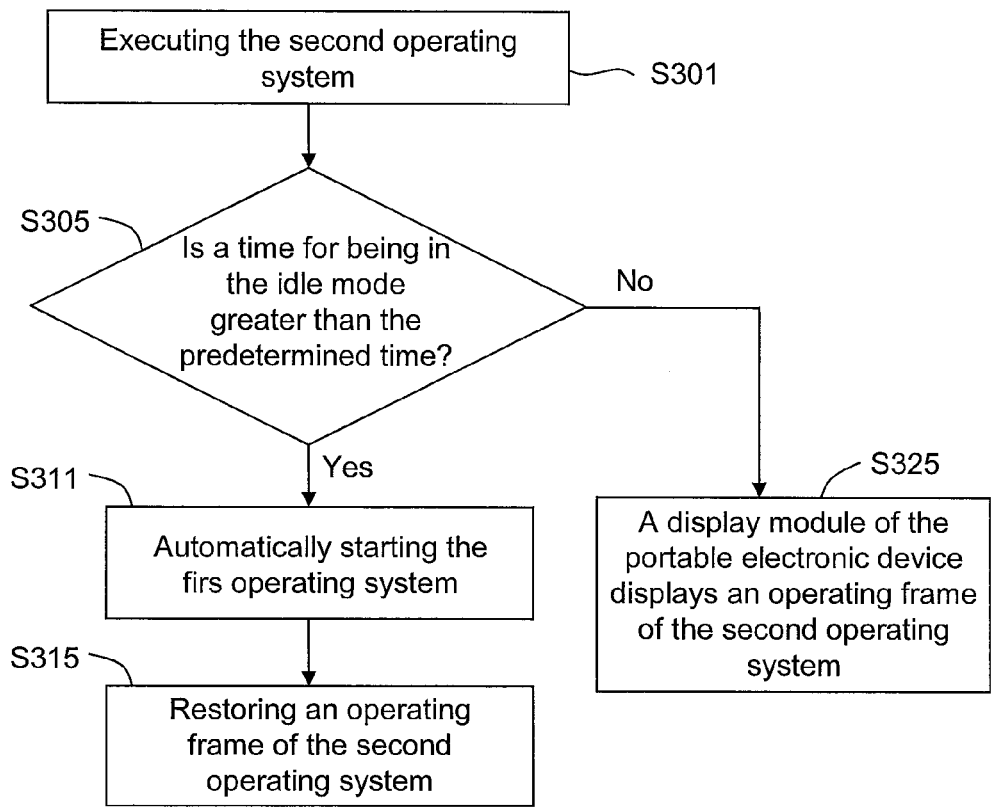
FIG. 3 is a simple flowchart illustrating an operating method of a dual operating system according to an embodiment of the invention.

Moreover, in case that the portable electronic device and the docking station are coupled to each other, and the portable electronic device executes the second operating system, a method of starting the first operating system is introduced below with reference of figures. FIG. 3 is a simple flowchart illustrating an operating method of a dual operating system according to an embodiment of the invention. Referring to FIG. 3, in case that the portable electronic device and the docking station are coupled to each other, in step S301, the portable electronic device executes the second operating system. Regarding the step of executing the second operating system, when the portable electronic device is booted, the user or the system automatically selects to execute the second operating system, and the portable electronic device automatically loads and executes the first part of the second operating system stored in the portable electronic device and the second part of the second operating system stored in the docking station, i.e. executes the complete second operating system. In step S305, in a normal operating state of the second operating system, it is determined whether a time for the second operating system executed by the portable electronic device being in an idle mode exceeds a predetermined time, where the idle mode is a state that a processor usage rate is lower than a setting value when the portable electronic device executes the second operating system. The setting value of the processor usage rate is, for example, 5%-50%, and the predetermined time is for example, 10-20 minutes, though the invention is not limited thereto. In another embodiment, the predetermined time can be an idle time upper limit set by the user.

In step S311, when the time for the second operating system executed by the portable electronic device being in the idle mode exceeds the predetermined time, the portable electronic device automatically starts the first operating system. Then, in step S315, after activation of the first operating system is completed, an operating frame of the second operating system is restored. On the other hand, when it is determined that the time for the second operating system executed by the portable electronic device being in the idle mode does not exceed the predetermined time in the step S305, a display module of the portable electronic device displays the operating frame of the second operating system (step S325), which is, for example, a desktop frame of the second operating system.

Figure 4:
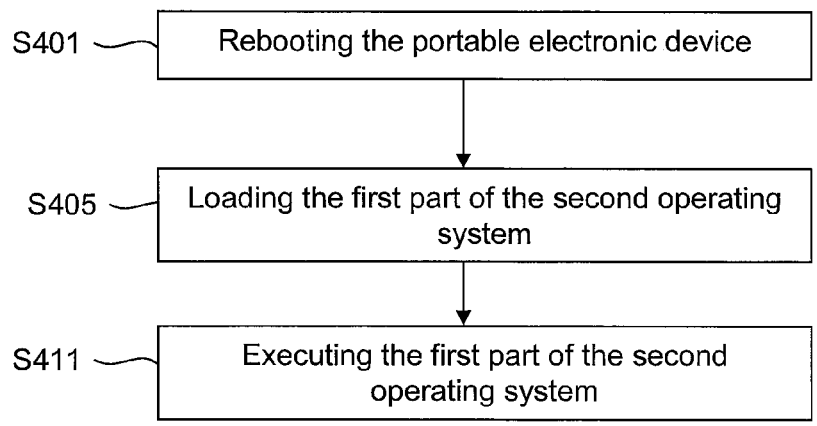
FIG. 4 is a simple flowchart illustrating a flow that a portable electronic device executes a second operating system and automatically starts a first operating system under an idle mode of the second operating system according to an embodiment of the invention.

Moreover, in an embodiment, steps that the portable electronic device automatically starts the first operating system are as follows. FIG. 4 is a simple flowchart illustrating a flow that the portable electronic device executes the second operating system and automatically starts the first operating system according to an embodiment of the invention. Referring to FIG. 4, in step S401, the portable electronic device is rebooted. Then, in step S405, the first operating system is loaded, where the step of loading the first operating system is to, for example, load the first operating system into a memory of the portable electronic device. Then, in step S411, the first operating system is executed, where the step of executing the first operating system is to, for example, execute the first operating system by a processor, so as to start and execute the first operating system.

In case that the user does not operate the portable electronic device coupled to the docking station, or the loading of the portable electronic device is relatively low, the portable electronic device can automatically start and execute the first operating system, so that when the user subsequently removes the portable electronic device from the docking station, the second operating system can be directly switched to the first operating system to save a time for starting the first operating system.

In the aforementioned embodiments, the portable electronic device executes one operating system, and during normal operation of the operating system, the portable electronic device automatically starts another operating system to facilitate saving the time for switching the other operating system in the subsequent switching operation. However, the invention is not limited thereto, an in another embodiment, when the power of the portable electronic device is turned on to perform a booting procedure of the portable electronic device, the connection controller is used to determine whether the portable electronic device and the docking station are coupled to each other. When it is determined that the portable electronic device is coupled to the docking station, the display module of the portable electronic device displays an operating system menu including options respectively representing the first operating system and the second operating system to facilitate the user selecting to execute the first operating system or the second operating system. When the user selects to execute the first operating system, the docking station is regarded as an external storage device of the portable electronic device. In another embodiment, while the user couples the booted portable electronic device that executes the first operating system to the docking station, according to a connection signal generated by a connector of the portable electronic device, the processor of the portable electronic device automatically displays the operating system menu on the display module to facilitate the user selecting whether or not to reboot the portable electronic device to switch the first operating system (suitable for the portable electronic device) to the second operating system (suitable for a large-scale computer device, such as a notebook computer, a home computer and a terminal device, etc.).

Figure 5:
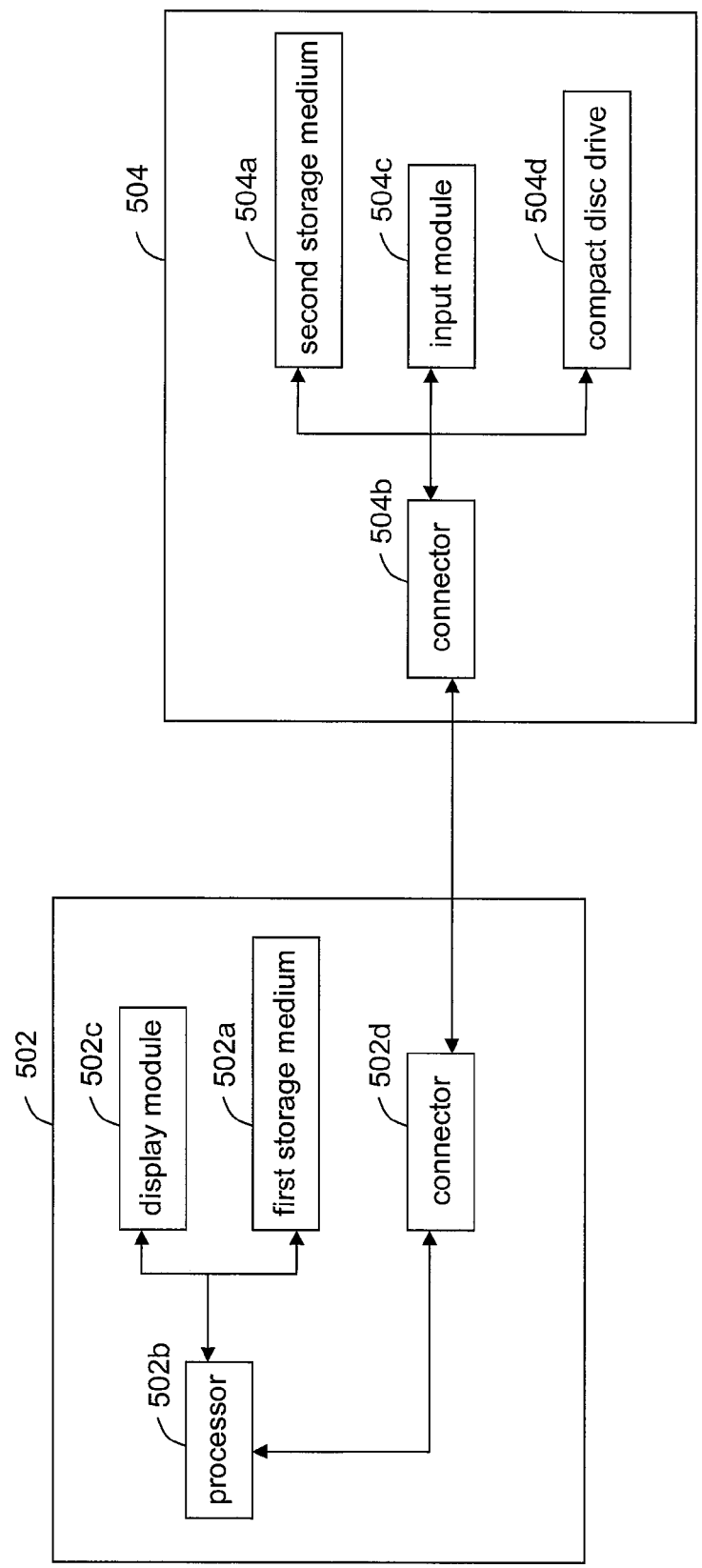
FIG. 5 is a diagram illustrating a docking system according to an embodiment of the invention.

Referring to FIG. 5, FIG. 5 is a diagram illustrating a docking system according to an embodiment of the invention. The docking system of the present embodiment includes a portable electronic device 502 and a docking station 504. The portable electronic device 502 includes a first storage medium 502a and a processor 502b. The first storage medium 502a stores the first operating system and a part of the second operating system. The processor 502b is, for example, a central processing unit (CPU) of an X86 architecture. The portable electronic device 502 further includes a display module 502c and a connector 502d. The portable electronic device 502 further has a connection controller, which is used for detecting whether the portable electronic device and the docking station are connected to each other, so as to determine whether the portable electronic device can execute the complete second operating system.

The docking station 504 includes a second storage medium 504a. The second storage medium stores the second part of the second operating system. The docking station 504 further includes a connector 504b, an input module 504c and a compact disc (CD) drive 504d. The input module 504c can receive an input signal from a physical keyboard, a virtual keyboard, a touch device or a mouse device. The docking station 504 is connected to the connector 502d of the portable electronic device 502 through the connector 504b. When the portable electronic device 502 is coupled to the docking station 504 to form the docking system, and the portable electronic device 502 executes the operating system (the second operating system) suitable for a large-scale computer device such as a notebook computer, a home computer and a terminal device, etc., the docking system can be regarded as the large-scale computer device such as a notebook computer, a home computer and a terminal device, etc., which can provide diversified application software and carry on relatively complicated computations and operations. Along with a different product design, the portable electronic device and the docking station can also be connected through wireless signals for command and data transmission without using the physical connectors. The wireless signal can be a bluetooth signal, an infrared signal or a wireless LAN signal.

When the processor 502b of the portable electronic device 502 executes the first operating system (the aforementioned step S101), and a time for the first operating system being in the idle mode exceeds the predetermined time (the aforementioned step S105), the processor 502b automatically starts the first part of the second operating system (the aforementioned step S111), and restores the operating frame of the first operating system (the aforementioned step S115). The step that the processor 502b automatically starts the first part of the second operating system (the aforementioned step S111) further includes the steps S201-S211 of the embodiment of FIG. 2, which are not repeated herein.

Moreover, when the processor 502b executes the complete second operating system composed of the first part stored in the first storage medium 502a and the second part stored in the second storage medium 504a of the docking station 504 (the aforementioned step S301), and when the time for the second operating system being in the idle mode exceeds the predetermined time (the aforementioned step S305), the processor 502b automatically starts the first operating system (the aforementioned step S311), and restores the operating frame of the second operating system (the aforementioned step S315). The step that the processor 502b automatically starts the first operating system (the aforementioned step S311) further includes the steps S401-S411 of the embodiment of FIG. 4, which are not repeated herein.

In summary, in the invention, the portable electronic device executes an operating system, and when the time for the operating system being in the idle mode exceeds the predetermined time, as none important program is executed in the idle mode, the portable electronic device automatically starts another operating system to prepare for the subsequent switching operation of the dual operating system (for example, initially start and execute a part of the second operating system or completely start the first operating system). Therefore, when the user switches the portable electronic device from the operating system to the other operating system, a time for starting the other operating system is greater reduced, so that the two operating systems can be quickly switched.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An operating method of a dual operating system, adapted to switch a first operating system and a second operating system on a docking system composed of a portable electronic device and a docking station, wherein the second operating system comprises a first part and a second part, the portable electronic device stores the first operating system and the first part of the second operating system, and the docking station stores the second part of the second operating system, the operating method of the dual operating system comprising:
  determining a state of the portable electronic device;
  when the portable electronic device executes the first operating system and determines that a time for the first operating system being in an idle mode thereof exceeds a first predetermined time, the portable electronic device automatically starting the first part of the second operating system and restoring an operating frame of the first operating system after the first part of the second operating system is activated; and
  when the portable electronic device and the docking station are coupled to each other and when the portable electronic device executes the first part and the second part of the second operating system and determines that a time for the second operating system being in an idle mode thereof exceeds a second predetermined time, the portable device automatically starting the first operating system and restoring an operating frame of the second operating system after the first operating system is activated; and
  when the portable electronic device and the docking station are not coupled to each other, the portable electronic device automatically executing the first operating system.

2. The operating method of the dual operating system as claimed in claim 1, wherein a storage space of the first operating system is smaller than a storage space of the second operating system.

3. The operating method of the dual operating system as claimed in claim 1, wherein the first part of the second operating system comprises operating system activation prerequisite kernel codes for starting the second operating system.

4. The operating method of the dual operating system as claimed in claim 1, wherein the second part of the second operating system comprises application program activation codes.

5. The operating method of the dual operating system as claimed in claim 1, wherein the idle mode of the first operating system is a state that a processor usage rate is lower than a setting value when the portable electronic device executes the first operating system.

6. The operating method of the dual operating system as claimed in claim 1, wherein when the portable electronic device executes the first operating system and determines that the time for the first operating system being in the idle mode thereof exceeds the first predetermined time, the step that the portable electronic device automatically starts the first part of the second operating system comprises:
  rebooting the portable electronic device;
  loading the first part of the second operating system; and
  executing the first part of the second operating system.

7. The operating method of the dual operating system as claimed in claim 1, wherein the step that the portable electronic device executes the second operating system comprises loading and executing the first part of the second operating system stored in the portable electronic device and the second part of the second operating system stored in the docking station.

8. The operating method of the dual operating system as claimed in claim 1, wherein when the portable electronic device executes the second operating system and determines that the time for the second operating system being in the idle mode thereof exceeds the second predetermined time, the step that the portable electronic device automatically starts the first operating system comprises:
  rebooting the portable electronic device;
  loading the first operating system; and
  executing the first operating system.

9. The operating method of the dual operating system as claimed in claim 1, wherein the idle mode of the second operating system is a state that a processor usage rate is lower than a setting value when the portable electronic device executes the second operating system.

10. A portable electronic device, adapted to be coupled to a docking station, and the portable electronic device comprising:
  a processor;
  a storage medium, storing a first operating system and a first part of a second operating system, wherein the second operating system is composed of the first part and a second part, the second part of the second operating system is stored in the docking station, and the first part of the second operating system is automatically executed by the processor according to a state of the portable electronic device; and
  a connection controller, detecting a connection state of the portable electronic device and the docking station, wherein
  the processor determines a state of the portable electronic device;
  when the portable electronic device executes the first operating system and determines that a time for the first operating system being in an idle mode thereof exceeds a first predetermined time, the portable electronic device automatically starts the first part of the second operating system and restores an operating frame of the first operating system after the first part of the second operating system is activated;
  when the connection controller detects that the portable electronic device and the docking station are coupled to each other and when the portable electronic device executes the first part and the second part of the second operating system and determines that a time for the second operating system being in an idle mode thereof exceeds a second predetermined time, the portable device automatically starts the first operating system and restores an operating frame of the second operating system after the first operating system is activated; and
  when the connection controller detects that the portable electronic device and the docking station are not coupled to each other, the portable electronic device executes the first operating system.

11. The portable electronic device as claimed in claim 10, wherein a storage space of the first operating system is smaller than a storage space of the second operating system.

12. The portable electronic device as claimed in claim 10, wherein the first part of the second operating system comprises operating system activation prerequisite kernel codes for starting the second operating system.

13. The portable electronic device as claimed in claim 10, wherein the second part of the second operating system comprises application program activation codes.

14. The portable electronic device as claimed in claim 10, wherein the idle mode of the first operating system is a state that a processor usage rate is lower than a setting value when the portable electronic device executes the first operating system.

15. The portable electronic device as claimed in claim 10, wherein the idle mode of the second operating system is a state that a processor usage rate is lower than a setting value when the portable electronic device executes the second operating system.

16. The portable electronic device as claimed in claim 10, wherein the docking station further comprises an input module.

17. A docking system, comprising:
- a portable electronic device, comprising a first storage medium storing a first operating system and a first part of a second operating system, a connection connector and a processor, wherein when the portable electronic device executes the first operating system and determines that a time for the first operating system being in an idle mode thereof exceeds a first predetermined time, the first part of the second operating system is automatically executed by the processor; and
- a docking station, connected the portable electronic device, and comprising a second storage medium storing a second part of the second operating system, wherein the second operating system is composed of the first part and the second part, and the connection controller is used for detecting a connection state of the portable electronic device and the docking station, wherein
- when the connection controller detects that the portable electronic device and the docking station are coupled to each other and when the portable electronic device executes the first part and the second part of the second operating system and determines that a time for the second operating system being in an idle mode thereof exceeds a second predetermined time, the portable device automatically starts the first operating system and restores an operating frame of the second operating system after the first operating system is activated; and
- when the connection controller detects that the portable electronic device and the docking station are not coupled to each other, the portable electronic device executes the first operating system.

18. The docking system as claimed in claim 17, wherein a storage space of the first operating system is smaller than a storage space of the second operating system.

19. The docking system as claimed in claim 17, wherein the first part of the second operating system comprises operating system activation prerequisite kernel codes for starting the second operating system.

20. The docking system as claimed in claim 17, wherein the second part of the second operating system comprises application program activation codes.

21. The docking system as claimed in claim 17, wherein the idle mode of the first operating system is a state that a processor usage rate is lower than a setting value when the portable electronic device executes the first operating system.

22. The docking system as claimed in claim 17, wherein the idle mode of the second operating system is a state that a processor usage rate is lower than a setting value when the portable electronic device executes the second operating system.

23. The docking system as claimed in claim 17, wherein the docking station further comprises an input module.

\* \* \* \* \*